United States Patent [19]

Taylor

[11] Patent Number: 4,634,095
[45] Date of Patent: Jan. 6, 1987

[54] MULTIPLE STAGE CHOKE VALVE

[76] Inventor: Julian S. Taylor, 8300 SW. 8, Oklahoma City, Okla. 73128

[21] Appl. No.: 759,380

[22] Filed: Jul. 26, 1985

[51] Int. Cl.[4] ............................................. F16K 47/04
[52] U.S. Cl. ................................ 251/121; 137/625.37; 251/127
[58] Field of Search ...................... 251/121, 120, 127; 137/625.37

[56] References Cited

U.S. PATENT DOCUMENTS

| | | | |
|---|---|---|---|
| 3,971,411 | 7/1976 | Baumann | 137/625.37 X |
| 4,078,582 | 3/1978 | Hetz | 251/121 X |

FOREIGN PATENT DOCUMENTS

| | | | |
|---|---|---|---|
| 520187 | 3/1931 | Fed. Rep. of Germany | 251/120 |
| 1107471 | 5/1961 | Fed. Rep. of Germany | 251/120 |
| 584729 | 11/1958 | Italy | 251/121 |
| 592870 | 5/1959 | Italy | 251/121 |
| 257240 | 3/1970 | U.S.S.R. | 251/121 |
| 396506 | 1/1974 | U.S.S.R. | 251/127 |

Primary Examiner—Arnold Rosenthal
Attorney, Agent, or Firm—Robert K. Rhea

[57] ABSTRACT

In a choke valve having flow restricting stages for controlling fluid under relatively high pressure, a rising stem axially moves a valve toward and away from a valve seat opening and closing a fluid passageway through the valve. A plurality of superposed flow restriction members, each closely surrounding the valve stem and having a recess loosely surrounding the valve stem, are disposed on the upstream side of the valve seat. Slots, formed in the valve stem wall, mate and mismate with the flow restriction recesses in response to axial movement of the valve stem and control fluid under relatively high differential pressure across the valve.

3 Claims, 4 Drawing Figures

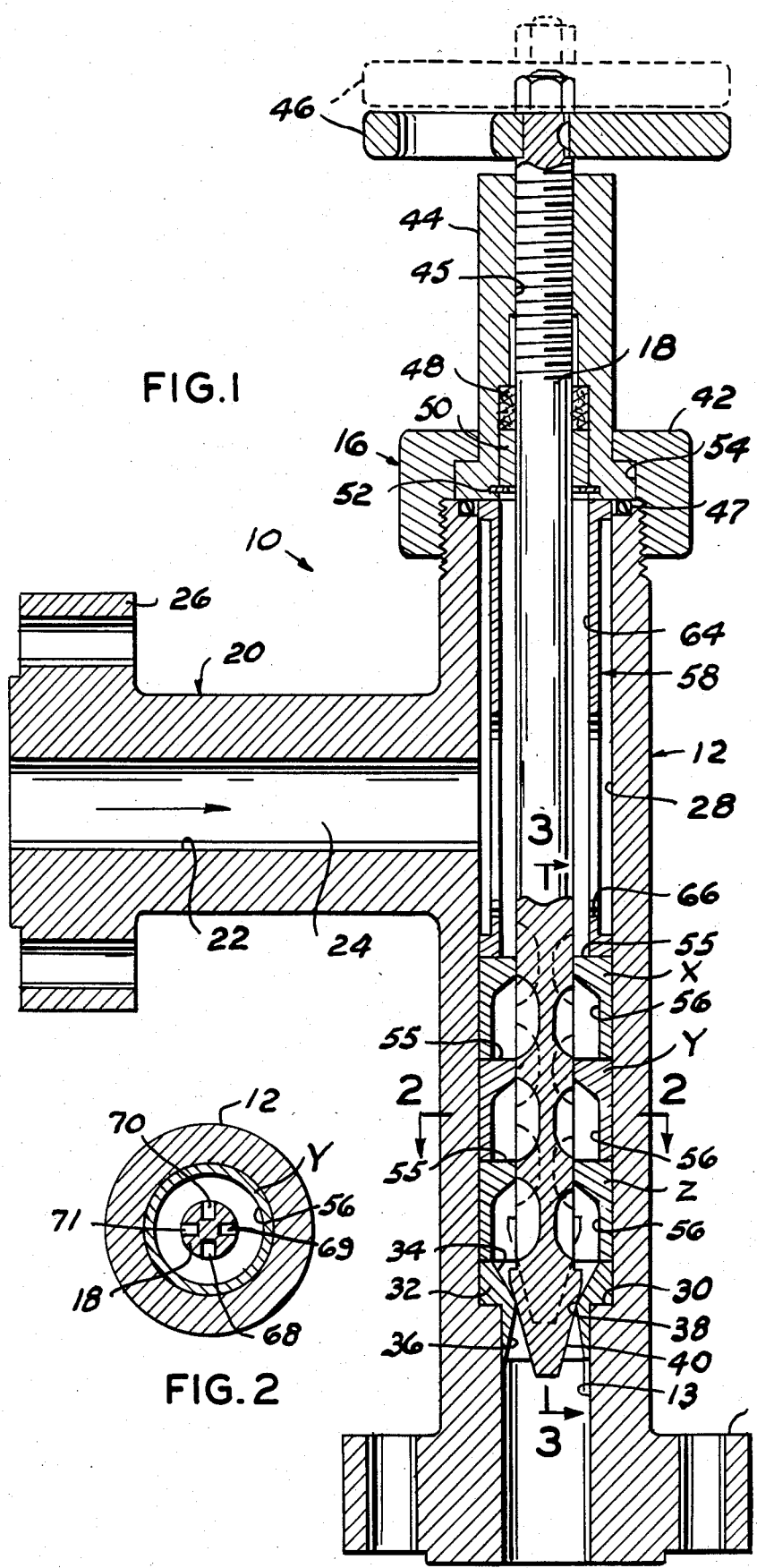
FIG.1
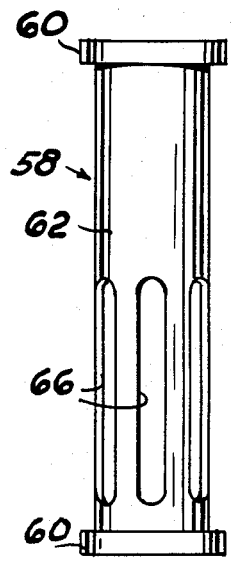
FIG. 4
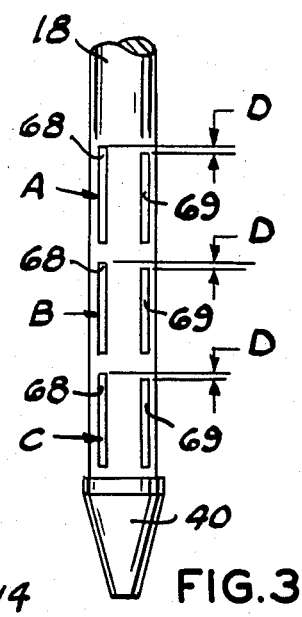
FIG. 2
FIG. 3

MULTIPLE STAGE CHOKE VALVE

BACKGROUND OF THE INVENTION

1. Field of the Invention.

The present invention relates to gate valves and more particularly to multiple stage choke valves.

2. Description of the Prior Art.

Choke valves or flow restriction valves, as presently used and shown by the prior art, have generally comprised two or more disc members having transverse straight through or tapered openings which are partially or fully mated for controlling the flow volume and pressure drop across the flow restricting discs. These rotating disc type flow restriction valves operate satisfactorily but have the disadvantage of generating a surge of the fluid flow therethrough at the moment of opening or partially mating the flow-through apertures particularly when the pressure drop across the discs encompasses a wide range of pressure.

This invention is distinctive over flow restriction or choke valves of this type by providing a gate valve having a plurality of four flow restricting stages in its fluid passageway controlling the fluid flow by a series of radially spaced longitudinally staggered slots in its valve stem cooperating with a like series of fluid recesses formed in the flow passageway wall surrounding the gate valve stem.

SUMMARY OF THE INVENTION

The gate valve comprises a body adapted to be interposed in a fluid line and having a flow passage therethrough. The valve is characterized by a rising stem having a valve on its depending end seating and unseating on a valve seat to form a positive seal when closing the fluid passageway. The valve stem is provided with a plurality of groups of radially and longitudinally spaced slots in its wall mating and mismating with a like plurality of longitudinally spaced recesses formed in the wall of a like plurality of restriction members closely surrounding the valve stem for controlling fluid flow through the passageway and reducing the pressure drop across the valve stem, its valve and seat to a desired maximum.

The principal object of this invention is to provide an easily operated gate valve of the rising stem type seating and unseating a valve in a flow passageway which includes a plurality of flow restricting pressure differential reducing stages upstream from the valve and its seat for high pressure industrial applications.

BRIEF DESCRIPTION OF THE DRAWINGS

FIG. 1 is a vertical cross sectional view, partially in elevation, of the gate valve in fluid passageway closed position and illustrating, by dotted lines, its fully opened position;

FIG. 2 is a horizontal sectional view taken substantially along the line 2—2 of FIG. 1;

FIG. 3 is a fragmentary elevational view of the depending end of the valve stem taken substantially along the line 3—3 of FIG 1; and, FIG. 4 is an elevational view of a sleeve interposed in the passageway upstream from the valve and its seat.

DESCRIPTION OF THE PREFERRED EMBODIMENTS

Like characters of reference designate like parts in those figures of the drawings in which they occur.

In the drawings:

The reference numeral 10 indicates the gate valve, as a whole, which is generally T-shaped in side elevation in its preferred embodiment. The head portion 12 of the T-shaped body is centrally bored, as at 13, and provided with a flange 14 at its downstream end portion or port for connection with a pipeline, or the like, and provided at its other end with packing gland means 16 surrounding and sealing the outwardly projecting end portion of a valve stem 18, as presently explained.

The T-shape includes a stem portion 20 centrally bored, as at 22, for communication with the head bore 13 and forming the inlet portion or port of a fluid passageway 24 normal to the axis of the downstream outlet port with the stem 20 similarly provided with a pipe connecting end flange 26 at its fluid inlet end.

Obviously, the valve body flanged ends 14 and 26 may be omitted and the head and stem respectively threaded, if desired, for connection with a pipeline, not shown.

The valve body head 12 is counterbored from its packing gland end, as at 28, to define an annular shoulder 30 spaced inwardly from its flanged end 14 which supports a valve seat support 32 characterized by upstream and downstream tapered bores 34 and 36 respectively intersecting intermediate the ends of the seat support 32 to form an annular valve seat 38. The depending end portion of the valve stem 18, as viewed in FIG. 1, is similarly provided with a valve 40 having a frusto-conical surface converging toward its downstream end for seating and unseating on the seat 38.

The valve stem packing means 16 includes a centrally bored packing nut 42 threadedly engaged with the adjacent end of the valve body head and surrounding the flanged end portion of a valve stem guide 44 having a threaded bore 45 threadedly surrounding the end portion of the valve stem opposite the valve 40. The outward end of the valve stem is provided with a handle or control wheel 46 for angularly rotating the valve stem in a raising and lowering action to move the valve 40 toward and away from its seat. The packing gland means further includes an O-ring 47 interposed between the valve stem guide 44 and adjacent end of the valve body. Packing 48, a follower 50 and a snap ring 52 surround the valve stem within a counterbore 54 in the inward end of the valve stem with its guide.

A plurality of centrally bored cylindrical flow restriction members X, Y and Z closely surround the valve stem in superposed relation in the flow passageway adjacent the valve seat support 32. The flow restriction members are identical, each having an upwardly disposed right circular end surface 55, as viewed in FIG. 1, and each is counterbored from its downstream end on a predetermined diameter 56 substantially greater than the diameter of the valve stem. The flow restriction members X, Y and Z are maintained in superposed end abutting relation by a sleeve 58 interposed between the valve stem guide 44 and flow restriction member X.

The sleeve 58 includes annular outstanding flanges 60 at its respective ends freely received by the valve body counterbore 28 thus disposing the wall 62 of the sleeve inwardly of the wall forming the counterbore to form a fluid annulus around the sleeve. The bore 64 of the sleeve loosely surrounds the periphery of the valve stem 18 and the sleeve wall 62 is provided with a plurality of longitudinally extending radially spaced fluid passage apertures 66.

The valve stem wall is provided with a like series of groups of fluid throttling slots A, B and C, (FIG. 3), one group of four slots for each of the cylindrical restriction member X, Y and Z. Each group of slots of the series A, B and C comprise four longitudinally extending radially spaced slots 68, 69, 70 and 71. The purpose of the slots 69-71 being for restrictively opening and closing the fluid passageway by mating and mismating with the recess 56 of the respective cylindrical flow restriction. The slots 68-71 are relatively narrow when compared with the diameter of the valve stem (FIG. 3) and are identical except for their length in which the upper end of the slots in each group are progressively spaced downstream. The bottom or downstream end limit of each slot of each group of slots terminate in a horizontal plane common with the depending limit of the respective restriction member X, Y or Z. As viewed in FIGS. 1 and 3, the slot 68 being the greatest in length, the slot 69 being slightly shorter than the slot 68 by a distance D (FIG. 3). By way of example, the distance D is 0.010 inch (0.0254 cm). Similarly, the length of the slot 70 is less than the length of the slot 69 by the same increment of distance D with the slot 71 being the shortest one of the four slots of each group.

Obviously, the valve stem 18 and members X, Y and Z are preferably formed from erosion resistant material, such as carbide steel.

OPERATION

Assuming the valve 10 is operatively installed in a high pressure line and that the valve 40 is seated on its seat 48 thus positively closing the fluid passageway, the gate valve is opened by angularly rotating the valve stem 18. Angular rotation of the valve stem 18 in a counterclockwise direction, as viewed from the top of the control wheel 46, axially moves the valve stem relative to the flow restriction members X, Y and Z. The pitch of the valve stem threads 45 initially unseats the valve 40 and further angular rotation of the stem positions the upper end limit of the respective valve stem slots 68 above the top end surface 55 of the respective restriction member X, Y and Z for initial opening or "cracking" of the gate valve. Fluid initially flows through the respective valve stem slot 68 and recess 56 while further rotation of the valve stem disposes the upper end limit of the respective valve stem slots 69 above the plane of the top surface 55 of the members X, Y and Z. The volume of fluid flow through the passageway is controlled by the width and depth of the slots and their position with respect to the end limit 55 of the members X, Y and Z. The maximum flow volume being obtained when the medial portion of the respective slots are in substantial alignment with the surfaces 55, as indicated by dotted lines (FIG. 1). This step by step successive positioning of all the slots 69-71 in a flow opening mode results in accurate control of fluid pressure differential across the valve which may be on the order of 6,500 psi. Obviously, when the valve stem is angularly rotated in the opposite direction, the valve 40 is moved toward its seat and the valve stem slots decrease the fluid flow through the fluid passageway in reverse order in which the shorter one, 71, of the valve stem slots initially mismates with the respective recess 56 until all of the valve stem slots are disposed below the upper end limit 55 of the respective member X, Y, and Z before the valve 40 is seated.

Obviously the invention is susceptible to changes or alterations without defeating its practicability. Therefore, I do not wish to be confined to the preferred embodiment shown in the drawings and described herein.

I claim:

1. A choke valve, comprising:
    a valve body having an inlet port and an outlet port defining a flow passageway;
    an annular valve seat in the flow passageway adjacent the outlet port;
    an axially moveable valve stem intersecting and extending into the downstream end portion of the flow passageway and defining an annulus around the valve stem in the downstream end portion of the flow passageway;
    a valve on the downstream end of said valve stem for sealing with the valve seat; and,
    flow restriction means in the flow passageway annulus cooperating with said valve stem for dividing the flow passageway annulus into a longitudinally extending series of axially spaced annular recesses, said flow restriction means comprising,
    a plurality of centrally bored cylindrical members having an upstream end portion closely surrounding intermediate portions said valve stem,
    said cylindrical members each having the major portion of its downstream end portion counterbored, and,
    said valve stem having a plurality of circumferentially spaced longitudinally extending relatively narrow, when compared with the diameter of the valve stem, radially penetrating throttling slots longitudinally bridged by the respective cylindrical member counterbore when the valve is seated,
    whereby axial movement of said valve stem in a valve opening direction progressively moves the throttling slots upstream for spanning the centrally bored upstream end portion of each cylindrical member and defining a like series of fluid restricting pressure differential reducing stages.

2. The valve according to claim 1 in which one end portion of said valve stem projects outwardly of said valve body and further including:
    packing gland means including a valve stem guide threadedly surrounding said one end portion of said valve stem; and, means for angularly rotating said valve stem.

3. The valve according to claim 1 in which each plurality of valve stem slots form a group and in which the several slots of each group terminate equidistant downstream and are of unequal length with respect to each other.

* * * * *